United States Patent [19]

Lederman

[11] Patent Number: 4,893,702

[45] Date of Patent: Jan. 16, 1990

[54] ROLLER CLUTCH WITH COMPACT WEAR REDUCTION MECHANISM

[75] Inventor: Frederick E. Lederman, Sandusky, Ohio

[73] Assignee: General Motors Corporation, Detroit, Mich.

[21] Appl. No.: 372,488

[22] Filed: Jun. 28, 1989

[51] Int. Cl.⁴ .............................................. F16D 41/06
[52] U.S. Cl. .................... 192/45; 192/41 R
[58] Field of Search .................... 192/41 R, 44, 45

[56] References Cited

U.S. PATENT DOCUMENTS

| | | | |
|---|---|---|---|
| 2,044,197 | 6/1936 | Barthel | 192/45 |
| 2,332,061 | 10/1943 | Conkle | 192/45 |
| 2,532,670 | 12/1950 | La Brie | 192/45 X |
| 3,223,213 | 12/1965 | Bowcott | 192/45 |
| 4,821,856 | 4/1989 | Lederman | 192/45 |
| 4,828,086 | 5/1989 | Lederman | 192/45 |

FOREIGN PATENT DOCUMENTS 254291 12/1963 Australia ........................ 192/45

*Primary Examiner*—Rodney H. Bonck
*Assistant Examiner*—David A. Testardi
*Attorney, Agent, or Firm*—Patrick M. Griffin

[57] ABSTRACT

A compact roller spin reduction mechanism for an overrunning roller clutch includes a roller control block that holds each roller, but loosely enough that the block can be thrown out into the pathway and rub on it during overrun. This creates a drag force that opposes the roller energizing spring and reduces pathway traction and its consequent roller spin. The block is sufficiently compact to stay entirely within a wedging pocket as the clutch operates.

3 Claims, 2 Drawing Sheets

ROLLER CLUTCH WITH COMPACT WEAR REDUCTION MECHANISM

This invention relates to overrunning roller clutches in general, and specifically to such a roller clutch that has a compact mechanism for reducing roller spin and its consequent wear.

BACKGROUND OF THE INVENTION

The two most common choices for overrunning clutches in high speed environments, such as shift timing in the gear sets of automatic transmissions, are sprag clutches and roller clutches. Sprag clutches have dumbbell sprags with sloped end surfaces that jam between two confronting cylindrical race surfaces to lock up in one direction, while allowing overrun in the other. In order to work well, the races between which a sprag clutch is installed must be maintained coaxial to one another with a high degree of accuracy, requiring precision bearings. Nor are sprags as strong as rollers, so a large number must be used. However, since they do not spin, sprags are not especially speed sensitive.

A great advantage of roller clutches is that their races need not be maintained coaxial nearly as accurately. The rollers sit in sloped wedging pockets formed between cam ramps on a cam race and the confronting cylindrical surface of a pathway race. The rollers are continually spring biased to a lock up ready position at the narrow end of the wedging pocket, in nearly continual contact with both races. The rollers can travel circumferentially back and forth in the wedging pockets, under their spring bias, remaining at a ready to compensate for the race running eccentricity that continually enlarges and reduces the size of the wedging pockets. The big disadvantage of rollers is that they are more speed sensitive than sprags. Since each roller is in nearly continual contact with both races, traction from the rapidly relatively rotating pathway race can spin it against, and potentially wear on, the cam race. Continually smaller transmissions are operating at faster and faster speeds, to the point where conventional roller clutches may not work. Still, the cost advantage of a roller clutch is so great that a non speed sensitive roller clutch capable of replacing a sprag clutch in high speed applications would be highly desirable.

Recent advances in roller clutch design by the assignee of the subject invention have provided a new approach to controlling roller spin. Rather than directly reducing pathway traction in the first instance, the ability of pathway traction to actually cause the roller to spin is resisted. This is done through the use of a plurality of roller control cars, one for each roller. Each roller is pop fitted very tightly and closely into a respective car, tightly enough that if the roller attempts to spin, the car will turn with it. Side bars on the cars interfitted with side rails of the cage stop the cars from turning with the rollers more than a few degrees, and also keep the cars from contacting the pathway race. After the cars have stopped twisting relative to the cage, pathway traction continues to try to spin the rollers, which then rub on the inside of the tight fitting cars, retarding the spin that would otherwise occur. Roller skew control is also provided, since the rollers are kept square to the cars, and the interfit of the cars with the cage keeps the cars square to the cage. In addition, a releasable latch can be provided to keep the cars locked to the cage during shipping. While such a car is compact, and does not impinge on the space between the races needed for other parts of the cage, there will be clutch environments where pathway traction is so severe, and potential roller spin speeds so high, that a means for directly reducing pathway traction, rather than just retarding the roller spin that it causes, would be desirable.

SUMMARY OF THE INVENTION

The invention provides a means for directly reducing pathway traction and roller spin that is as compact as the tightly fitting roller car described above. The preferred embodiment disclosed also provides roller skew control and a secure roller shipping retention.

The clutch of the invention is installed in the space between a cam race and a pathway race. When the races are properly coaxially disposed, the configuration of the space between them includes of an evenly spaced plurality of wedging pockets, each of which extends in one circumferential direction from a wide to a narrow end. The wedging pockets are separated by an equal plurality of annular bearing spaces. The wedging pockets represent the space available in which a cylindrical roller can move as the clutch operates, over a predetermined travel path. A spring biases each roller as it moves, and so requires a predetermined space between the roller travel path and the wide end of the wedging pocket. The bearing spaces represent the space available for whatever bearing structure is used to keep the races coaxial. The clutch cage includes a plurality of journal blocks and other cage structure that substantially and completely fill the annular bearing spaces, and which cannot be intruded into by any other structure. The compact wear reduction means of the invention uses only space within the wedging pockets not otherwise committed.

Each roller is received within a central roller receiving pocket in a roller control block. The pocket creates two portions on either side of the roller, the first of which is given a circumferential width substantially equal to the space available between the roller travel path and the spring space, and the second of which is given a circumferential width substantially equal to the space available between the roller travel path and the narrow end of the wedging pocket. The circumferential clearance between the roller and the block pocket is small enough that the spring, which presses on the first portion of the block, can act efficiently on the roller as it travels. Unlike the roller control car described above, however, the clearance is large enough that the block can move radially relative to the roller without interference. A means is provided to so move the the surface of the pathway race can rub on an outer centrifugal force in the embodiment disclosed. Thus, the pathway race can rub on the outer surface of each portion of the control block, which provides a frictional force tending to drag the block and its roller toward the wide end of the wedging pocket, in opposition to the spring. The drag force directly reduces the amount of pathway race traction on the roller, and its consequent spin. The frictional drag force on the block ceases at the transition from overrun to lock up, so quick lock up is still possible.

In addition, in the embodiment disclosed, loose fitting roller retention ribs prevent the rollers from falling out of the blocks before clutch installation, and a snap interfit of the blocks with the cage side rails prevents the blocks from falling out of the cage. This provides a secure shipping retention without jeopardizing the necessary radial motion of the block during clutch operation.

It is, therefore, a general object of the invention to reduce roller spin by directly opposing pathway traction on the roller, while working within the otherwise uncommitted space available within a wedging pocket.

It is another object of the invention to provide such a compact wear reduction means in the form of a plurality of roller control blocks, each of which has a central pocket that receives a roller so as to place a portion of the block on each side of the roller, and each of a width that keeps it entirely within the uncommitted wedging pocket space available between the limits of the roller travel, the spring space, and the narrow end of the wedging pocket.

It is another object of the invention to provide such a control block that receives the roller with sufficient radial clearance from the roller and from the cage that some means, such as centrifugal force, can move the block radially into the pathway race during overrun to provide a traction reducing drag force on the roller acting in opposition to the energizing spring.

It is still another object of the invention to provide such a control block that can retain the roller in its pocket and which is itself retained to the cage prior to installation, but without jeopardizing the necessary radial motion of the control block during clutch operation.

DESCRIPTION OF THE PREFERRED EMBODIMENT

These and other objects and features of the invention will appear from the following written description, and from the drawings, in which.

Figure 4:
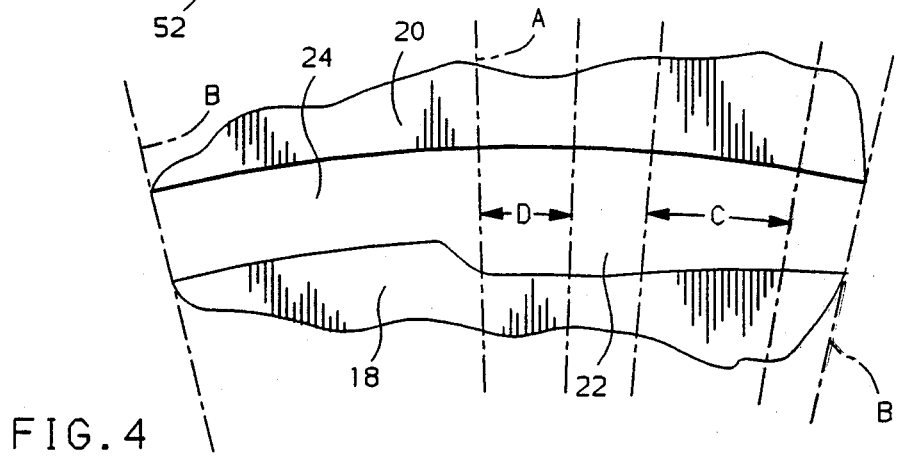
FIG. 4 is a schematic view showing the configuration of the space between the clutch races prior to the installation of the clutch.
Figure 7:
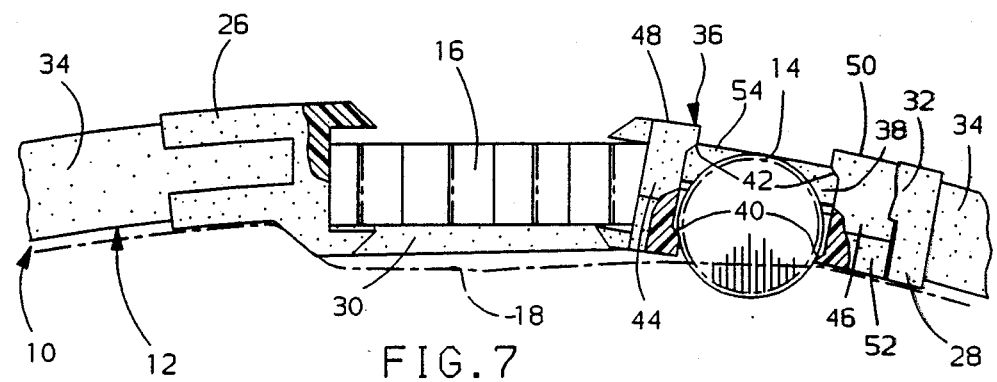
FIG. 7 is an enlarged axial view of a portion of the clutch prior to installation, illustrating shipping retention.

Referring first to FIGS. 4 and 7, a preferred embodiment of the overrunning roller invention is designated generally at 10. Clutch 10's basic components include a cage 12, a plurality of cylindrical steel rollers 14, and a matching plurality of energizing springs 16. Clutch cage 12 is adapted to be installed in the space between an inner cam race 18 and an outer pathway race 20. The cam race 18 could just as well be the outer race and vice versa, but an outer pathway race 20 suits the particular mode of operation of clutch 10. The outer surface of cam race 18 is machined with conventional sloped cam ramps, while the confronting pathway surface of pathway race 20 is cylindrical. When the races 18 and 20 are maintained accurately coaxial to one another, which they will not be until after cage 12 has been installed, the shape or configuration of the space between them will also be rigorously maintained. That space, although continuous, can be conveniently described in terms of a series of repetitive sub spaces. Each of an evenly spaced plurality of wedging pockets 22 slopes in one circumferential direction, clockwise here, from a wide end A to a narrow end B, shown by dotted radial lines. The wedging pocket 22 provides the space within which a respective roller 14 travels, the path of which is indicated by the double headed arrow C. The wedging pockets 22 are separated by an equal plurality of annular bearing spaces 24, which represent the space available for whatever structure of cage 12 is used to keeps the races 18 and 20 coaxial. The space occupied by spring 16 at its most compressed point is indicated at D, located between the roller 14 and the wedging pocket wide end A. The invention is compact enough to work within the space limitations just defined.

Figure 1:
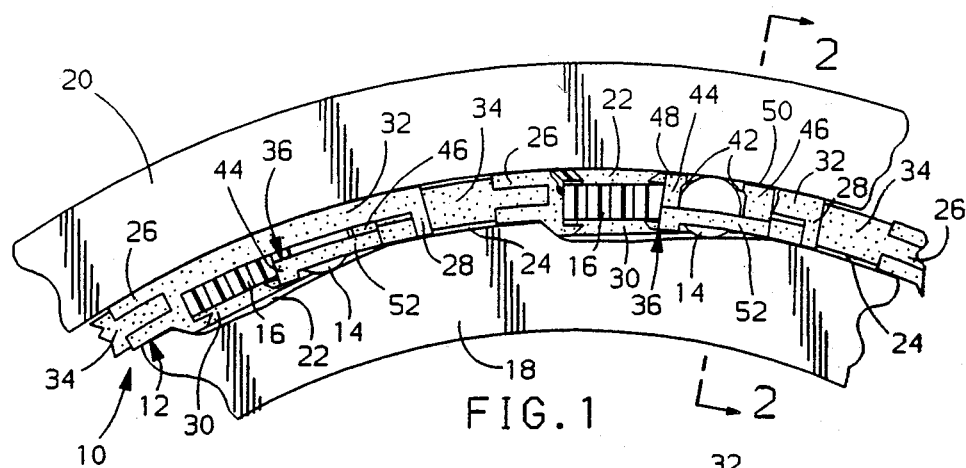
FIG. 1 is an axial view of a preferred embodiment of the clutch of the invention installed between the races, with a portion of the cage broken away.

Referring next to FIGS. 1 and 7, cage 12, which is by pass molded of a suitable plastic, includes a plurality of thick radial sections 26, generally referred to as journal blocks 26. One side of each journal block 26 is joined to a cross bar 28 by a pair of parallel, lower and upper side rails 30 and 32 to form a basic box. The other side of each journal block 26 is joined to an adjacent cross bar 28 by an arcuate connecting bar 34, giving a unitary structure. When cage 12 is installed, each journal block 26 almost entirely fills a large portion of a respective bearing space 24. As a consequence, the races 18 and 20 are maintained coaxial to one another with maximum precision, and can support heavy radial loads. The shape of the wedging pockets 22 is also maintained with maximum accuracy. The rest of each bearing space 24 is occupied by an adjacent cross bar 28 and connecting bar 34. In other cage structures, the journal blocks 26 might be even larger, taking up the whole bearing space 24 alone. In any event, any additional structure to be provided to reduce roller spin during clutch overrun can occupy only the restricted space remaining in wedging pocket 22 between the limits of the roller travel path C, the wedging pocket narrow end B, and the spring space D. Furthermore, any such additional structure cannot be allowed to limit the free movement of roller 14 over path C or the free expansion and contraction of spring 16. These represent rather severe limitations in terms of space and required operation. The wear reduction means of the invention, described in detail next, works within those limitations.

Figure 3:
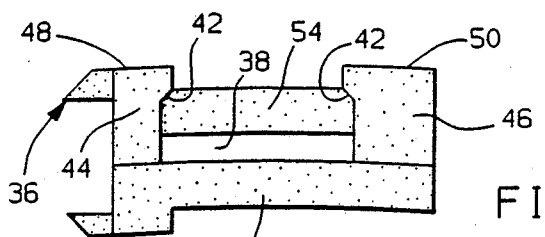
FIG. 3 is a side view of a control block alone.

Referring next to FIGS. 3, 4, and 7, each roller 14 is matched with a roller control block, indicated generally at 36, which is also by pass molded in one piece of a suitable plastic. Each control block 36 has a central roller receiving pocket 38 within which a respective roller 14 may be contained with a generally loose, but carefully controlled, fit. There is just enough circumferential clearance between the roller 14 and the surrounding inner surfaces of pocket 38 to allow block 36 to move radially relative to roller 14 without binding, although the degree of that clearance is exaggerated for clear illustration. This may be contrasted with the roller control car described above, where the roller makes a purposely tight, wrapping fit, so that the roller cannot move in any direction without taking the car with it. How far block 36 can move radially in or out within its pocket 38 is limited by a pair of lower and upper retention ribs 40 and 42, so roller 14 cannot fall completely out of block 36 before installation of clutch 10. The central location of pocket 38 effectively splits block 36 into a first and second portion, 44 and 46. The block first portion 44 is made substantially as wide in the circumferential direction as the uncommitted space between the counterclockwise limit of roller travel path C and the spring space D, but not wider. The block second portion 46 is made substantially as wide in the circumferential direction as the uncommitted space between the clockwise limit of roller travel path C and the wedging pocket narrow end B, but not wider. The respective outer surfaces of the block portions 44 and 46, indicated at 48 and 50, are arcuate, with a radius that conforms closely to the surface of pathway race 20. The two block portions 44 and 46 are joined by a pair of parallel, lower and upper side flanges 52 and 54, which have nearly the same axial separation as the cage lower and upper side rails 30 and 32.

Figure 2:
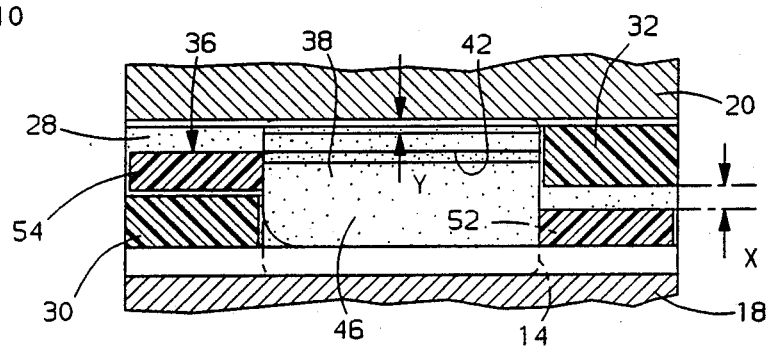
FIG. 2 is a sectional view of the clutch taken along the line 2—2 of FIG. 1.

Referring next to FIGS. 2 and 7, clutch 10 may be assembled by twisting and snap fitting each control block 36 in between a pair of lower and upper side rails 30 and 32. This brings the cage side rails 30 and 32 and the control block side flanges 54 and 52 respectively into the axially overlapping relation shown in FIG. 2. Then, a roller 14 is inserted between the pocket retention ribs 40 and 42 of each control block 36, and a spring 16 is added between each control block first portion 44 and its opposed cage journal block 26. Before installation, when gravity acts on a control block 36, it will be prevented from falling out of cage 12 by the overlapping interference between the side flanges 54 and 52 and the side rails 30 and 32, and by the fact that block 36 had to be resiliently forced between the side rails 30 and 32 in the first place. This will hold true regardless of whether spring 16 has yet been added, and no latch members are needed to hold the blocks 36 to cage 12. The net effect is a secure shipping retention of all blocks 36 and rollers 14 to cage 12. However, as best seen in FIG. 7, if cage 12 is held vertically, the rollers 14 in the uppermost control blocks 36, that is, those located near the 12 o'clock position, will hang down significantly below the post installation location of the surface of cam race 18, shown by a dotted line. This results from the deliberately loose fit of the rollers 14 within the block pockets 38, and would hold true even if a releasable latch were provided to lock control block 36 to cage 12. So, while the shipping retention *security* of rollers 14 is essentially as good as it is for the tight fitting roller car described above, the accuracy of their shipping *position* clearly is not.

Referring next to FIGS. 1 and 2, the assembled clutch 10 is installed by the conventional push and twist, or "ringing in", method. Cage 12 is first pushed axially onto inner cam race 18. The fact that rollers 14 fit so loosely within the block pockets 38 means that an installation jig, or a large lead in chamfer on cam race 18, might be necessary in order to properly position each roller 14 during the initial push on step. This is a practical problem, but soluble, and cannot be avoided, since it is the deliberate looseness of fit of the rollers 14 that is crucial to the improved operation of clutch 10. Next, pathway race 20 is pushed over the installed clutch 10 and simultaneously twisted counterclockwise into position. The rollers 14 are moved counterclockwise to a nominal position, and the springs 16 are compressed from their shipping length. Each roller 14 and its control block 36 is now located in a respective wedging pocket 22, with its first portion 44 between the roller 14 and the wedging pocket wide end A, and its second portion 46 between the roller 14 and wedging pocket narrow end B. As best seen in FIG. 2, the uppermost control blocks 36 now sit with their lower side flanges 52 resting on the surface of the cam race 18, spaced from the cage upper side rails 32 by the maximum possible radial clearance, indicated at X. The arcuate control block rubbing surfaces 48 and 50 rest beneath the surface of the pathway race 20, also with the maximum possible radial clearance, indicated at Y. The upper side flanges 54 rest above the cage lower side rails 30 with a slight clearance. For the lowermost control blocks 36, not shown, the arcuate rubbing surfaces 48 and 50 would actually be resting on the surface of the pathway race 20. But the relation of X and Y is the same for all control blocks 36, regardless of their angular location at any point in time.

Figure 5:
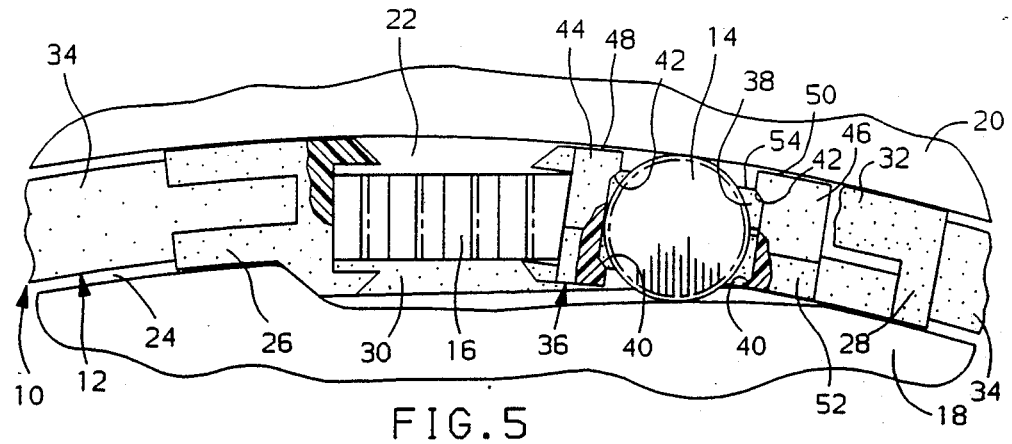
FIG. 5 is an enlarged view of one wedging pocket after installation of the clutch, showing the lockup mode.

Referring next to FIG. 5, the lock up mode of clutch 10 is illustrated. The rollers 14 are kept near the wedging pocket narrow end B during overrun by the springs 16, as will be more fully described below. Lock up occurs when the force balance on the races 18 and 20 tends to rotate the cam race 18 counterclockwise relative to the pathway race 20, or the pathway race 20 clockwise relative to the cam race 18. This carries the rollers 14 toward the wedging pocket narrow end B, where they jam and lock the races 18 and 20 together to rotate at the same speed. It will be noted that the second control block portion 46 has not intruded into the adjacent bearing space 24 or hit the cage cross bar 30. It cannot, since that is as far clockwise as roller 14 can carry control block 36. Roller spin and skew are obviously not a problem during lockup, as the races 18 and 20 are stationary relative to one another. They are a potential problem during overrun, however, described next.

Figure 6:
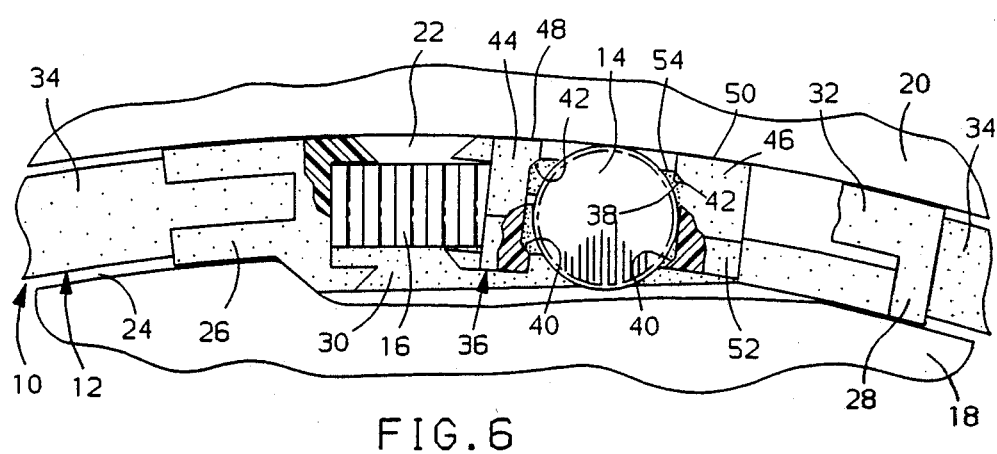
FIG. 6 is a view like FIG. 5, but showing the overrun mode.

Referring next to FIG. 6, the overrun mode is illustrated, when the force balance on the races 18 and 20 rotates the cam race 18 rapidly clockwise relative to pathway race 20. In the particular vehicle automatic transmission environment in which clutch 10 would be used, the absolute speed of inner cam race 18 is clockwise and rapid, while the outer pathway race 20 is stationary. Relative to the cam race 18 and the rollers 14, however, the pathway race 20 is rotating rapidly counterclockwise. The rollers 14 are not maintained at ready position during overrun in the same way as in a conventional clutch. During overrun, all control blocks 36 are thrown radially outward by the centrifugal force of the rapidly rotating inner cam race 18 until the block outer surfaces 48 and 50 contact and conform to the cylindrical surface of outer race pathway race 20. The outward radial motion of the blocks 36 occurs freely and without interference from any source, because of the circumferential clearance of the walls of the block pocket 38 from the rollers 14, and because the radial clearance X is greater than Y, as noted above. Nor do the retention ribs 40 and 42 hit roller 14 as block 36 moves out. Contact of the rubbing surfaces 48 and 50 with the pathway race 20 imposes a frictional drag force on each control block 36 that will tend to carry it and its roller 14 counterclockwise, toward the wedging pocket wide end A, in opposition to spring 16. The overrun drag force on block 36 is illustrated as being strong enough to have actually physically moved roller 14 away from contact with the cam race 18, although the amount of physical movement is exaggerated for illustration. Thus, while roller 14 could still be spun by the traction of pathway race 20, it could not wear on cam race 18. Even if roller 14 were not physically moved out of actual contact with the cam race 18, the opposition to the force of spring 16 would still reduce the potential traction of pathway race 20 on rollers 14. The amount of traction reducing drag force would be proportional to the relative rotational speed difference of the races 18 and 20, and so would be greater when the need was greater. Furthermore, the drag force will cease as soon as the force balance changes so as tend to rotate pathway race 20 clockwise relative to cam race 18, and the springs 16 can again act without opposition, assuring quick lock up.

Referring next to FIGS. 4 and 6, it will be recalled that there is a running eccentricity between the races 18 and 20, which is inevitable, since the journal blocks 26 cannot be made to fit too tightly in the bearing spaces 24, or installation would be difficult. During overrun, a force balance is achieved on rollers 14 between the drag of the blocks 36 in one direction and the force of the springs 16 in the other, and an equilibrium position of each roller 14 within its own wedging pocket 22 will be achieved. That equilibrium position is not static, but oscillates over the path C, due to periodic changes in the shape of the wedging pockets 22 caused by the running eccentricity. As the rollers 14 travel, the springs 16 simultaneously expand and contact, maintaining their bias on rollers 14. While the spring bias must be applied indirectly to the rollers 14, through the block pockets 38, the circumferential clearance shown between the rollers 14 and the walls of the block pockets 38 is sufficiently small that there is no significant delay or lost motion in the action of spring 16. As each roller 14 travels during overrun, its control block 36 does not intrude into either the spring space D, nor does it move past its wedging pocket narrow end B into the adjacent bearing space 24. This relationship is mutually reinforcing, in that keeping the bearing spaces 24 free allows the journal blocks 26 to be as large as possible, so as to keep the races 18 and 20 as concentric as possible, in turn keeping path C as short as possible, so that there is the the maximum possible uncommitted space in wedging pocket 22 available to make the block portions 44 and 46 to be as wide as possible. This, in turn, allows the arcuate surfaces 48 and 50 to present the maximum possible surface area to rub on the pathway race 20 at overrun, giving the greatest potential drag force within the limited space available. Furthermore, during overrun, each control block 36 can provide a measure of skew control to its roller 14. Of course, since X is greater than Y, the control block lower side flanges 52 cannot receive circumferential guidance during overrun from the cage upper side rails 32 that overlay them. Still, each control block 36 is maintained square to the axis of clutch 10 by virtue of the fact that its surfaces 48 and 50, which are as large as possible, have a radius that conforms to the surface of the pathway race 20. Furthermore, each roller 14 is kept substantially square to its control block 36, since the circumferential clearance from the walls of pocket 38 is small. The net effect is that the rollers 14 are kept substantially square to the axis of clutch 10. So, there is a high degree of cooperation between and among the various structural elements of the preferred embodiment disclosed, providing the rollers 14 spin reduction, skew control, and shipping retention, all within a very compact space.

Variations of the embodiment disclosed could be made. A control block like 36 could work even if the cam race 18 were the outer race and the pathway race 20 the inner race. Centrifugal force could not then be used to move the control block 36, but another means for pressing the control block rubbing surfaces 48 and 50 into the pathway race 20 could be used. For example, a resilient spring or springs which had a provision to slide back and forth in the wedging pocket 22 with the travel of roller 14 could press off of the cam race 18 and into the control block portions 44 and 46, keeping the surfaces 48 and 50 in constant contact with the surface of pathway race 20. Such a scheme would work regardless of whether the cam race 18 were inner or outer. It would not matter that the control blocks 36 would be in contact with the pathway race 20 during lockup as well, as there is no relative motion between the races 18 and 20 during lockup. In its simplest form, the control block 36 need not have any structure to keep it from falling out of cage 12, nor would the control block pocket 38 have to include any means for retaining the roller 14 against fall out during shipping. The traction reducing drag force during overrun results from the rubbing engagement of the arcuate surfaces 48 and 50 with the cylindrical surface of the pathway race 20, not from any sliding interfit of the block 36 with the cage 12, nor from the tightness of fit of roller 14 within pocket 38. However, the shipping retention of the control blocks 36 and rollers 14 to cage 12 is provided with no ill effect on the basic drag force action, and without affecting the compact nature of the structure, so long as the various radial and circumferential clearances described in detail above are provided. Rubbing surfaces other than the arcuate, pathway conforming surfaces 48 and 50 could be used, which would still rub on the pathway race 20 and provide the same basic, wear reducing drag force. The arcuate surfaces 48 and 50 are much preferred, however, since they not only provide the maximum possible area in rubbing contact with the pathway race 20, but conform strongly to it to help keep the control block 36 square to the axis of the clutch 10. Therefore, it will be understood that it not intended to limit the invention to just the embodiment disclosed.

The embodiments of the invention in which an exclusive property or privilege is claimed are defined as follows:

1. An overrunning roller clutch of the type that is adapted to be located in the space between a cam race and a coaxially disposed pathway race, said space being comprised of an evenly spaced plurality of wedging pockets, each extending in one circumferential direction from a wide to a narrow end and separated from one another by a plurality of annular bearing spaces, and in which a cylindrical roller located in each wedging pocket requires a predetermined travel path within its respective wedging pocket as said clutch operates, said clutch comprising, a cage adapted to be installed between said races including a plurality of journal blocks which substantially fill said annular bearing spaces, thereby accurately maintaining the configuration of said wedging pockets, a plurality of energizing springs, each of which requires a predetermined spring space in which to operate between a respective wedging pocket wide end and roller first side in order to be capable of continually biasing said roller in said one circumferential direction, toward the narrow end of said wedging pocket, so as to be ready to quickly wedge between said races when said cam race attempts to rotate relative to said pathway race in the opposite circumferential direction, while said cam race may freely overrun relative to said pathway race in said one circumferential direction, a plurality of roller control blocks, each of which has a central roller receiving pocket located such that a first portion of said block, upon which a respective spring bears, has a circumferential width substantially equal to the wedging pocket space available between said roller travel path and said spring space, while a second portion of said block has a circumferential width substantially equal to the wedging pocket space available between said roller travel path and said wedging pocket narrow end, said roller further being received within said central pocket with sufficient clearance that said control block can be moved radially toward said pathway race sufficiently far that a rubbing surface of said control block portions will contact said pathway race, and, means for so radially moving each control block radially during overrun so as to engage the rubbing surface of said control block portions with said pathway race with sufficient force to induce a frictional force on said control block in the opposite circumferential direction, whereby, when said cam race overruns relative to said pathway in said one circumferential direction, each of said control blocks will tend to be moved toward the wide end of its respective wedging pocket by the frictional force induced on it by said pathway race and will consequently tend to move its respective roller toward the wide end of its wedging pocket, opposing its energizing spring while remaining entirely within its wedging pocket, by virtue of the width of said block portions, with the frictional force of said pathway race on said control block ending as said cam race reverses its relative direction.

2. An overrunning roller clutch of the type that is adapted to be located in the space between an inner cam race that rotates rapidly in one circumferential direction during overrun and a coaxially disposed pathway race, said space being comprised of an evenly spaced plurality of wedging pockets, each extending in said one circumferential direction from a wide to a narrow end and separated from one another by a plurality of annular bearing spaces, and in which a cylindrical roller located in each wedging pocket requires a predetermined travel path within its respective wedging pocket as said clutch operates, said clutch comprising, a cage adapted to be installed between said races including a plurality of journal blocks which substantially fill said annular bearing spaces, thereby accurately maintaining the configuration of said wedging pockets, a plurality of energizing springs, each of which requires a predetermined spring space in which to operate between a respective wedging pocket wide end and roller first side in order to be capable of continually biasing said roller in said one circumferential direction, toward the narrow end of said wedging pocket, so as to be ready to quickly wedge between said races when said cam race attempts to rotate relative to said pathway race in the opposite circumferential direction, while said cam race may freely overrun relative to said pathway race in said one circumferential direction, and, a plurality of roller control blocks, each of which has a central roller receiving pocket located such that a first portion of said block, upon which a respective spring bears, has a circumferential width substantially equal to the wedging pocket space available between said roller travel path and said spring space, while a second portion of said block has a circumferential width substantially equal to the wedging pocket space available between said roller travel path and said wedging pocket narrow end, said roller further being received within said central pocket with sufficient clearance that said control block can be moved radially toward said pathway race sufficiently far that an outer rubbing surface of said control block portions will contact said pathway race, and, whereby, when said inner cam race overruns relative to said pathway race in said one circumferential direction, centrifugal force will throw each of said control blocks radially outwardly until their outer rubbing surfaces contact said pathway race, thereby inducing a frictional force on said control blocks that will tend to move them toward the wide end of their respective wedging pockets, opposing said energizing springs while remaining entirely within said wedging pockets, by virtue of the width of said block portions, with the frictional force of said pathway race on said control blocks ending as said cam race reverses its relative direction.

3. An overrunning roller clutch of the type that is adapted to be located in the space between a cam race and a coaxially disposed pathway race, said space being comprised of an evenly spaced plurality of wedging pockets, each extending in one circumferential direction from a wide to a narrow end and separated from one another by a plurality of annular bearing spaces, and in which a cylindrical roller located in each wedging pocket requires a predetermined travel path within its respective wedging pocket as said clutch operates, said clutch comprising, a cage adapted to be installed between said races including a plurality of journal blocks which substantially fill said annular bearing spaces, thereby accurately maintaining the configuration of said wedging pockets, a plurality of energizing springs, each of which requires a predetermined spring space in which to operate between a respective wedging pocket wide end and roller first side in order to be capable of continually biasing said roller in said one circumferential direction, toward the narrow end of said wedging pocket, so as to be ready to quickly wedge between said races when said cam race attempts to rotate relative to said pathway race in the opposite circumferential direction, while said cam race may freely overrun relative to said pathway race in said one circumferential direction, a plurality of roller control blocks, each of which has a central roller receiving pocket located such that a first portion of said block, upon which a respective spring bears, has a circumferential width substantially equal to the wedging pocket space available between said roller travel path and said spring space, while a second portion of said block has a circumferential width substantially equal to the wedging pocket space available between said roller travel path and said wedging pocket narrow end, said control block further including retention means to retain said control block and its respective roller to said cage prior to clutch installation but having sufficient clearance from said roller and cage that said control block can be moved after installation radially toward said pathway race sufficiently far that a rubbing surface of said control block portions will contact said pathway race, and, means for so radially moving each control block radially during overrun so as to engage the rubbing surface of said control block portions with said pathway race with sufficient force to induce a frictional force on said control block in the opposite circumferential direction, whereby, said cage, control blocks and rollers are retained together as unit prior to clutch installation, and after installation, when said cam race overruns relative to said pathway race in said one circumferential direction, each of said control blocks will tend to be moved toward the wide end of its respective wedging pocket by the frictional force induced on it by said pathway race and will consequently tend to move its respective roller toward the wide end of its wedging pocket, opposing its energizing spring while remaining entirely within its wedging pocket, by virtue of the width of said block portions, with the frictional force of said pathway on said control block ending as said cam race reverses its relative direction.

* * * * *